(12) United States Patent
Mosher

(10) Patent No.: US 6,484,435 B1
(45) Date of Patent: Nov. 26, 2002

(54) FISHING SINKER DEVICE

(76) Inventor: Bruce Mosher, P.O. Box 104, Beltrami, MN (US) 56517

( * ) Notice: Subject to any disclaimer, the term of this patent is extended or adjusted under 35 U.S.C. 154(b) by 0 days.

(21) Appl. No.: 09/606,710

(22) Filed: Jun. 29, 2000

(51) Int. Cl.⁷ .......................... A01K 91/00; A01K 95/00
(52) U.S. Cl. ...................... 43/43.1; 43/43.14; 43/44.87; 43/44.95
(58) Field of Search ............... 43/43.1, 44.87, 43/43.14, 44.95, 44.93

(56) References Cited

U.S. PATENT DOCUMENTS

| | | | | |
|---|---|---|---|---|
| 3,323,247 A | * | 6/1967 | Murray | 43/44.87 |
| 3,670,447 A | * | 6/1972 | Wohead | 43/43.14 |
| 4,649,662 A | * | 3/1987 | Tharp et al. | 43/43.14 |
| 4,693,030 A | * | 9/1987 | Wohead | 43/42.22 |
| 4,941,279 A | * | 7/1990 | Swanson | 43/42.22 |
| 5,555,668 A | * | 9/1996 | Brasseur. | 43/43.15 |
| 5,970,649 A | * | 10/1999 | Alain et al. | 43/43.14 |
| 6,079,147 A | * | 6/2000 | Mosher | 43/44.95 |
| 6,145,240 A | * | 11/2000 | Adams et al. | 43/44.96 |

* cited by examiner

Primary Examiner—Kurt Rowan

(57) ABSTRACT

A fishing sinker device for maintaining the fishing line and attached fishing lure at the desired water level regardless of the terrain. The inventive device includes a buoyant member having a first end and a second end, a first engaging member attached to the first end of the buoyant member for engaging a fishing line, and a second engaging member attached to the second end of the buoyant member for engaging a weight. The buoyant member is preferably an elongate structure and is constructed of a buoyant material such as a foam rubber material or the like. The first engaging member includes a first slot for receiving the fishing line and the second engaging member includes a second slot for receiving a loop from the weight. The buoyant member maintains the fishing line at the desired height above the surface of the body of water during fishing regardless of the obstacles encountered during usage of the present invention.

12 Claims, 4 Drawing Sheets

FISHING SINKER DEVICE

BACKGROUND OF THE INVENTION

1. Field of the Invention

The present invention relates generally to sinker devices and more specifically it relates to a fishing sinker device for maintaining the fishing line and attached fishing lure at the desired water level regardless of the terrain.

Individuals that troll for fish often times desire to position the lure at a specified depth within the water above the lake bottom. Fishermen are capable of controlling this depth of the lure by providing a specified length of fishing line and controlling the velocity of the boat within the water. Unfortunately, it is very difficult for the fisherman to maintain a constant lure level within the water and the lure engages debris at the bottom of the lake including rocks and weeds. Hence, there is a need for a fishing system that maintains the lure at a desired water depth regardless of the terrain encountered.

2. Description of the Prior Art

Bottom bouncers and other sinker devices have been in use for years. Typically, a conventional bottom bouncer comprises a weight, an upper shaft, and a lower shaft. The upper shaft includes an attachment structure for securing to a fishing line a finite distance before the fishing lure. The lower shaft engages the lake bottom thereby supporting the fishing lure a finite distance above the lake bottom while the fisherman is trolling.

The main problem with conventional bottom bouncers is that they often times tip over during usage thereby causing the fishing lure to become lower within the water thereby catching debris such as weeds and rocks. Another problem with conventional bottom bouncers is that they are extremely difficult to attach to a fishing line often times requiring the fisherman to tie knots within the fishing line. Another problem is that conventional bottom bouncers often times collect debris such as weeds during usage thereby contributing to them tipping over and reducing the overall action of the fishing system.

While these devices may be suitable for the particular purpose to which they address, they are not as suitable for maintaining the fishing line and attached fishing lure at the desired water level regardless of the terrain. Conventional bottom bouncers simply do not provide a consistent level for the fishing lure and often times result in the fisherman having to reel in their fishing lure to clean debris from thereof.

In these respects, the fishing sinker device according to the present invention substantially departs from the conventional concepts and designs of the prior art, and in so doing provides an apparatus primarily developed for the purpose of maintaining the fishing line and attached fishing lure at the desired water level regardless of the terrain.

SUMMARY OF THE INVENTION

In view of the foregoing disadvantages inherent in the known types of bottom bouncers and weight devices now present in the prior art, the present invention provides a new fishing sinker device construction wherein the same can be utilized for maintaining the fishing line and attached fishing lure at the desired water level regardless of the terrain.

The general purpose of the present invention, which will be described subsequently in greater detail, is to provide a new fishing sinker device that has many of the advantages of the bottom bouncers and weight devices mentioned heretofore and many novel features that result in a new fishing sinker device which is not anticipated, rendered obvious, suggested, or even implied by any of the prior art bottom bouncers, either alone or in any combination thereof.

To attain this, the present invention generally comprises a buoyant member having a first end and a second end, a first engaging member attached to the first end of the buoyant member for engaging a fishing line, and a second engaging member attached to the second end of the buoyant member for engaging a weight. The buoyant member is preferably an elongate structure and is constructed of a buoyant material such as a foam rubber material or the like. The first engaging member includes a first slot for receiving the fishing line and the second engaging member includes a second slot for receiving a loop from the weight. The buoyant member maintains the fishing line at the desired height above the surface of the body of water during fishing regardless of the obstacles encountered during usage of the present invention.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing sinker device that will overcome the shortcomings of the prior art devices.

A second object is to provide a fishing sinker device for maintaining the fishing line and attached fishing lure at the desired water level regardless of the terrain.

Another object is to provide a fishing sinker device that is almost impossible to tip over during usage.

An additional object is to provide a fishing sinker device that maintains a consistent height above a terrain surface during trolling and other fishing activities.

A further object is to provide a fishing sinker device that reduces the likelihood of the fishing lure catching upon debris such as weeds and rocks.

Another object is to provide a fishing sinker device -that does not catch upon weeks and rocks.

A further object is to provide a fishing sinker device that easily attaches to various sizes of sinker weights.

An additional object is to provide a fishing sinker device that easily attaches to a fishing line.

A further object is to provide a fishing sinker device that is comprised of a foam rubber material that is capable of breaking apart when a force is applied thereby salvaging the fishing lure attached to the fishing line.

An additional object is to provide a fishing sinker device that allows noodling or slipping through debris such as rocks and brush.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
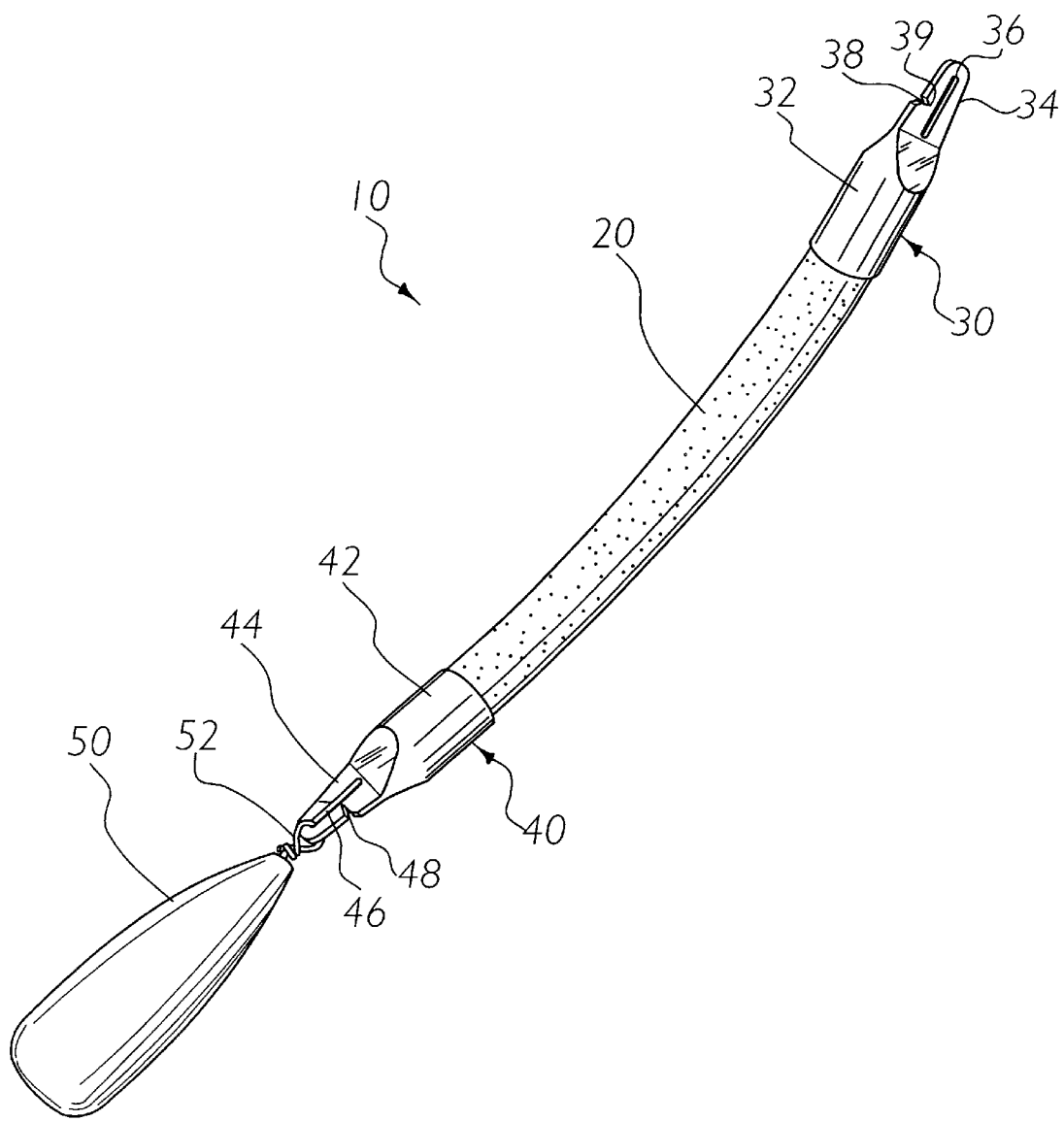
FIG. 1 is an upper perspective view of the present invention.

Turning now descriptively to the drawings, in which similar reference characters denote similar elements throughout the several views, FIGS. 1 through 4 illustrate a fishing sinker device 10, which comprises a buoyant member 20 having a first end and a second end, a first engaging member 30 attached to the first end of the buoyant member 20 for engaging a fishing line 12, and a second engaging member 40 attached to the second end of the buoyant member 20 for engaging a weight 50. The buoyant member 20 is preferably an elongate structure and is constructed of a buoyant material such as a foam rubber material or the like.. The first engaging member 30 includes a first slot 36 for receiving the fishing line 12 and the second engaging member 40 includes a second slot 46 for receiving a loop 52 from the weight 50. The buoyant member 20 maintains the fishing line 12 at the desired height above the surface of the body of water during fishing regardless of the obstacles encountered during usage of the present invention.

As shown in FIGS. 1 through 4 of the drawings, the buoyant member 20 is an elongate structure having a first end and a second end. The buoyant member 20 may have any well-known cross sectional shape such as but not limited to rectangular, circular, rectangular, or triangular. The buoyant member 20 is constructed of a material that is buoyant within water such as but not limited to a foam rubber material, Styrofoam or wood material. The buoyant member 20 may also be constructed of an enclosed tubular structure having an interior cavity for providing buoyancy during utilization.

In the preferred embodiment of the present invention, a foam rubber material is utilized thereby providing buoyancy and also flexibility. The flexibility of the buoyant member 20 is important for reducing the jarring effect upon the fishing lure 14 when engaging an obstruction such as a rock. The flexibility of the buoyant member 20 is also important for "noodling" or "slipping" through brush and rocks. The buoyant member 20 also is capable of breaking apart in the event the buoyant member 20 becomes snagged upon an obstacle such as a rock thereby allowing the fisherman to retain their fishing rig. The buoyant member 20 also allows a fisherman to "finesse" fish which is comprised of moving the fishing lure very slowly since the buoyant member 20 does not tip over regardless of the velocity within the water. The buoyant member 20 also retains the fishing line above the ground even when line tension is significantly reduced.

As shown in FIGS. 1 through 4 of the drawings, a first engaging member 30 is attached to the first end of the buoyant member 20. The first engaging member 30 is formed for receiving and supporting the fishing line 12. The first engaging member 30 is preferably constructed of a material such as but not limited to plastic.

Figure 2:
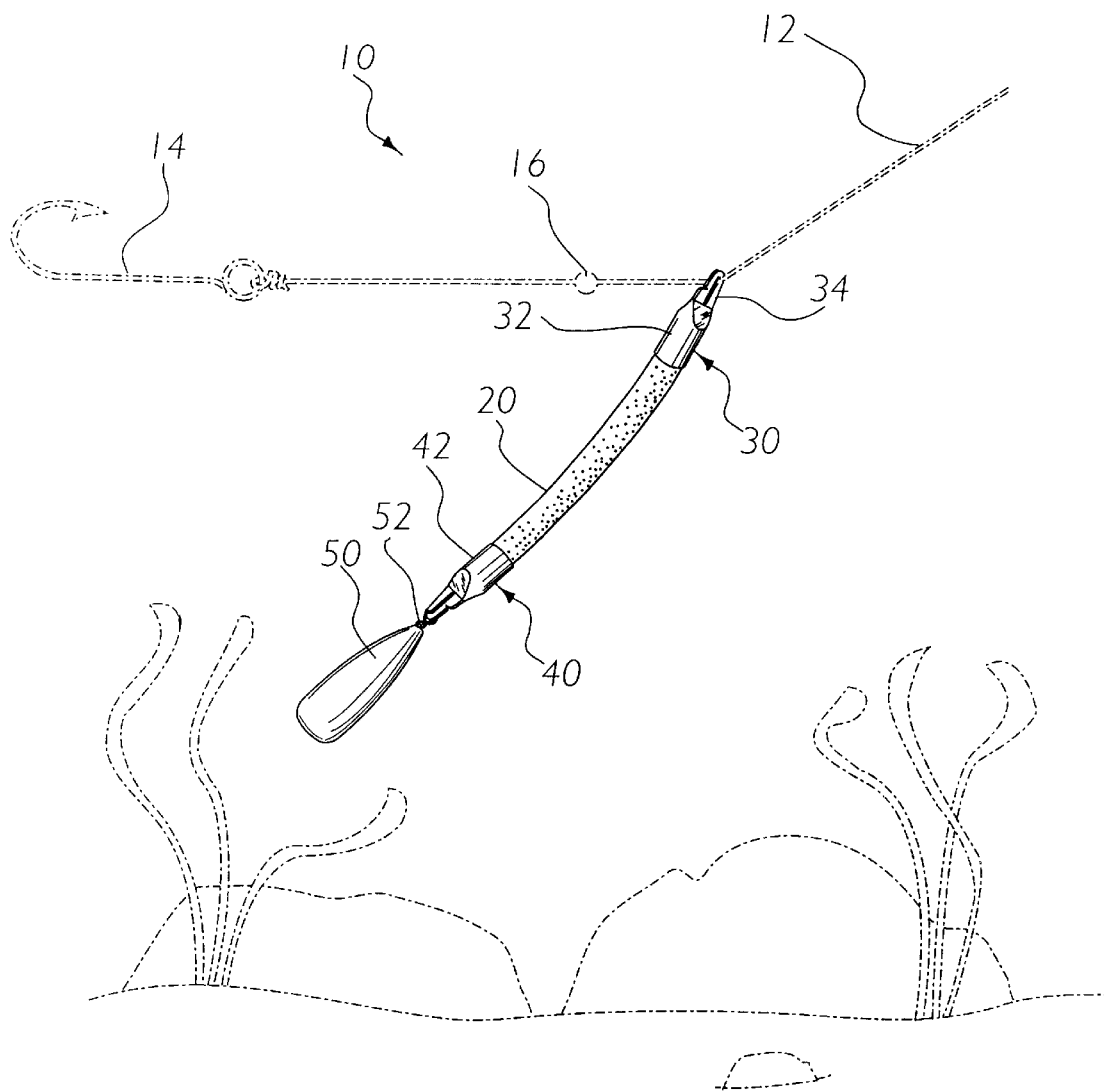
FIG. 2 is an upper perspective view of the present invention in operation.
Figure 4:
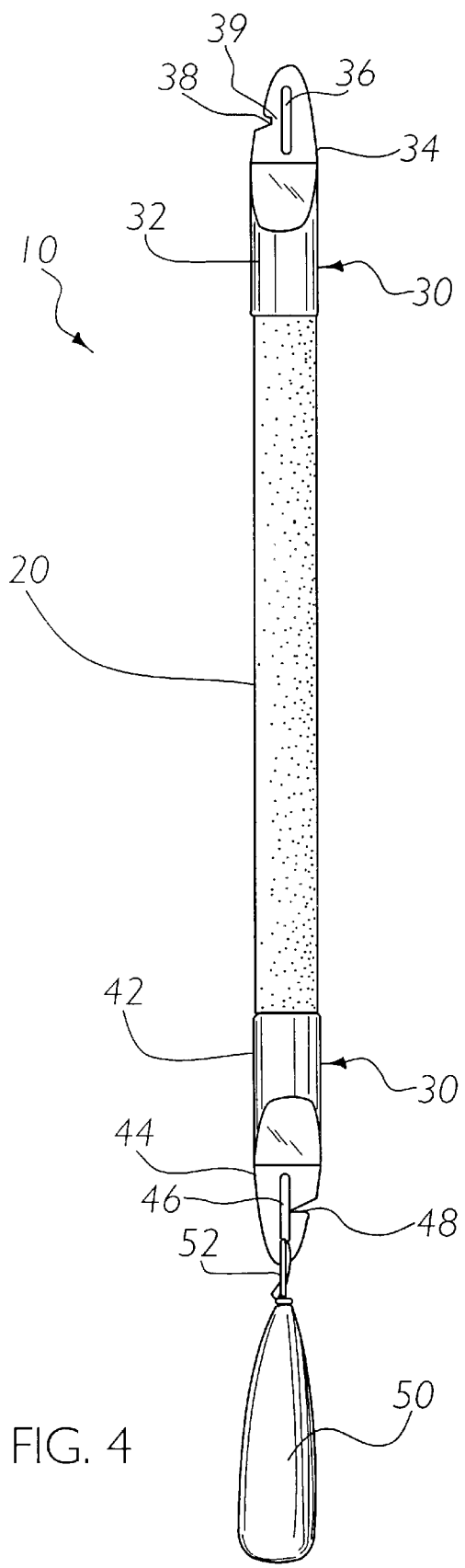
FIG. 4 is a side view of the present invention.

More specifically, the first engaging member 30 is comprised of a first body 32 having a first extended portion 34 extending from the first body 32. The first extended portion 34 includes a first slot 36 for slidably receiving the fishing line 12 as best shown in FIG. 4 of the drawings. A stopper 16 such as a knot, leader or lead device is attached to the fishing line 12 at the desired distance between the fishing lure 14 and the first engaging member 30 as best shown in FIG. 2 of the drawings.

As best shown in FIG. 4 of the drawings, the first extended portion 34 also includes a first inlet 38 for receiving the fishing line 12. The first inlet 38 is tapered inwardly toward the first slot 36 for allowing the fishing line 12 to be easily positioned into the first slot 36 but not easily removed from the first slot 36.

The first inlet 38 is preferably initially enclosed by an enclosed portion 39 thereby preventing accidental removal during engagement of the fishing lure 14 by a fish or an obstacle. The enclosed portion 39 may be "opened" with a conventional cutting device such as a knife or scissors for allowing the fishing line 12 to be inserted directly through the first inlet 38 without having to directly feed the fishing line 12 directly through the first slot 36.

Figure 3:
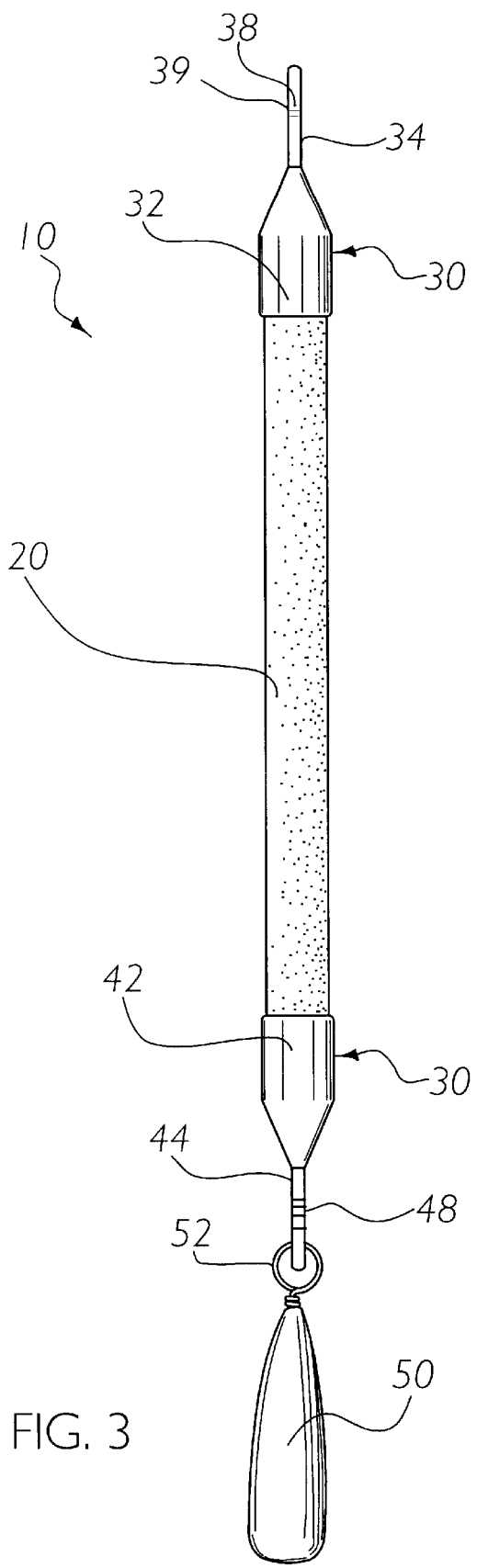
FIG. 3 is a front view of the present invention.

As shown in FIGS. 1 through 4 of the drawings, a second engaging member 40 is attached to the second end of the buoyant member 20 opposite of the first engaging member 30. The second engaging member 40 is formed for receiving the loop 52 of a weight 50 as best shown in FIGS. 3 and 4 of the drawings. The second engaging member 40 is preferably constructed of a material such as but not limited to plastic.

More specifically, the second engaging member 40 is comprised of a second body 42 having a second extended portion 44 extending from the second body 42. The second extended portion 44 includes a second slot 46 for receiving the loop 52 of the weight 50 as best shown in FIG. 4 of the drawings.

As best shown in FIG. 4 of the drawings, the second extended portion 44 also includes a second inlet 48 for receiving the fishing line 12. The second inlet 48 is tapered inwardly toward the second slot 46 for allowing the fishing line 12 to be easily positioned into the second slot 46 but not easily removed from the second slot 46.

In use, the user attaches the first engaging member 30 to a desired location along the fishing line 12. The user then attaches the desired weight 50 to the second engaging member 40 as shown in FIGS. 3 and 4 of the drawings. The user then trolls within a body of water such as a lake or river with the weight 50 engaging the bottom of the body of water. The buoyant member 20 maintains a substantially vertically orientated position within the water as the buoyant member 20 attempts to extend upwardly away from the weight 50 as shown in FIG. 2 of the drawings. The first engaging member 30 thereby maintains the level of the fishing line 12 at the desired height above the bottom of the body of water to ensure that the lure 14 does not engage obstacles such as rocks or weeds. Since the buoyant member 20 has an outer surface similar in size to the second engaging member 40 and the first engaging member 30 weeds and other debris typically slide off the buoyant member 20 without becoming entangled with the present invention. The user may adjust the weight 50 according to various water conditions and lures 14 utilized. In addition, the user may utilize various sizes and buoyancies of the buoyant member 20 depending upon various fishing conditions encountered.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing sinker device, comprising:
    a buoyant member having a first end and a second end, wherein said buoyant member has an elongate structure and is buoyant within water;
    a first engaging member secured to said first end of said buoyant member for engaging a fishing line; and
    a second engaging member secured to said second end of said buoyant member for engaging a weight;
    wherein said first engaging member is comprised of a first body, a first extended portion extending from said first body, a first slot within said first extended portion for receiving a fishing line, a first inlet extending into said first extended portion and into said first slot, wherein said first inlet is tapered toward said first slot, and an enclosed portion within said first inlet, wherein said enclosed portion is severable for exposing said first slot.

2. The fishing sinker device of claim 1, wherein said buoyant member is comprised of a foam rubber material.

3. The fishing sinker device of claim 1, wherein said first enclosed portion is adjacent said first slot.

4. The fishing sinker device of claim 1, wherein said second engaging member is comprised of:
    a second body;
    a second extended portion extending from said second body; and
    a second slot within said second extended portion for receiving a weight.

5. The fishing sinker device of claim 4, wherein said second engaging member further includes a second inlet extending into said second extended portion and into said second slot.

6. The fishing sinker device of claim 1, wherein said buoyant member is comprised of a foam rubber material that is capable of breaking apart when a force is applied to said buoyant member.

7. A fishing sinker device, comprising:
    a buoyant member having a first end and a second end, wherein said buoyant member has an elongate structure and is buoyant within water;
    a first engaging member secured to said first end of said buoyant member for slidably engaging a fishing line;
    a second engaging member secured to said second end of said buoyant member; and
    a weight removably attached to said second engaging member opposite of said buoyant member;
    wherein said first engaging member is comprised of a first body, a first extended portion extending from said first body, a first slot within said first extended portion for receiving a fishing line, a first inlet extending into said first extended portion and into said first slot, wherein said first inlet is tapered toward said first slot, and an enclosed portion within said first inlet, wherein said enclosed portion is severable for exposing said first slot.

8. The fishing sinker device of claim 7, wherein said buoyant member is comprised of a foam rubber material.

9. The fishing sinker device of claim 7, wherein said first enclosed portion is adjacent said first slot.

10. The fishing sinker device of claim 7, wherein said second engaging member is comprised of:
    a second body;
    a second extended portion extending from said second body; and
    a second slot within said second extended portion for receiving a weight.

11. The fishing sinker device of claim 10, wherein said second engaging member further includes a second inlet extending into said second extended portion and into said second slot.

12. The fishing sinker device of claim 7, wherein said buoyant member is comprised of a foam rubber material that is capable of breaking apart when a force is applied to said buoyant member.

* * * * *